United States Patent [19]
Stenger et al.

[11] 3,879,940
[45] Apr. 29, 1975

[54] GAS TURBINE ENGINE FUEL DELIVERY TUBE ASSEMBLY

[75] Inventors: Richard E. Stenger, Cincinnati; Alfred St. George, West Chester; Peter F. Kepf, New Richmond, all of Ohio

[73] Assignee: General Electric Company, Cincinnati, Ohio

[22] Filed: July 30, 1973

[21] Appl. No.: 384,000

[52] U.S. Cl. ............ 60/39.74 R; 60/39.32; 285/20; 285/27; 285/161; 239/600
[51] Int. Cl. .................................................. F02c 7/22
[58] Field of Search......... 60/39.74 R, 39.31, 39.32, 60/39.82 R; 285/158, 161, 19, 20, 23, 27; 239/600

[56] References Cited
UNITED STATES PATENTS

| | | | |
|---|---|---|---|
| 3,116,606 | 1/1964 | Dougherty et al. | 60/39.31 |
| 3,458,997 | 8/1969 | Clark | 60/39.74 R |
| 3,775,975 | 12/1973 | Stenger et al. | 60/39.74 R |

FOREIGN PATENTS OR APPLICATIONS
577,039   5/1946   United Kingdom............ 60/39.74 R

*Primary Examiner*—Carlton R. Croyle
*Assistant Examiner*—Robert E. Garrett
*Attorney, Agent, or Firm*—Dana F. Bigelow; Derek P. Lawrence; Lee H. Sachs

[57] ABSTRACT

An improved fuel delivery tube assembly for use with a gas turbine engine having a double walled casing is adapted to deliver fuel from a manifold mounted externally of the outer casing to a combustor carbureting device mounted internally of the inner casing. The assembly includes a main body member, which provides a fuel inlet and passageway, an alignment collar adapted to surround the main body member and preclude misalignment of the fuel passageway with respect to the combustor, and first and second sealing means adapted to preclude the leakage of high temperature/high pressure gas around the main body member.

13 Claims, 6 Drawing Figures

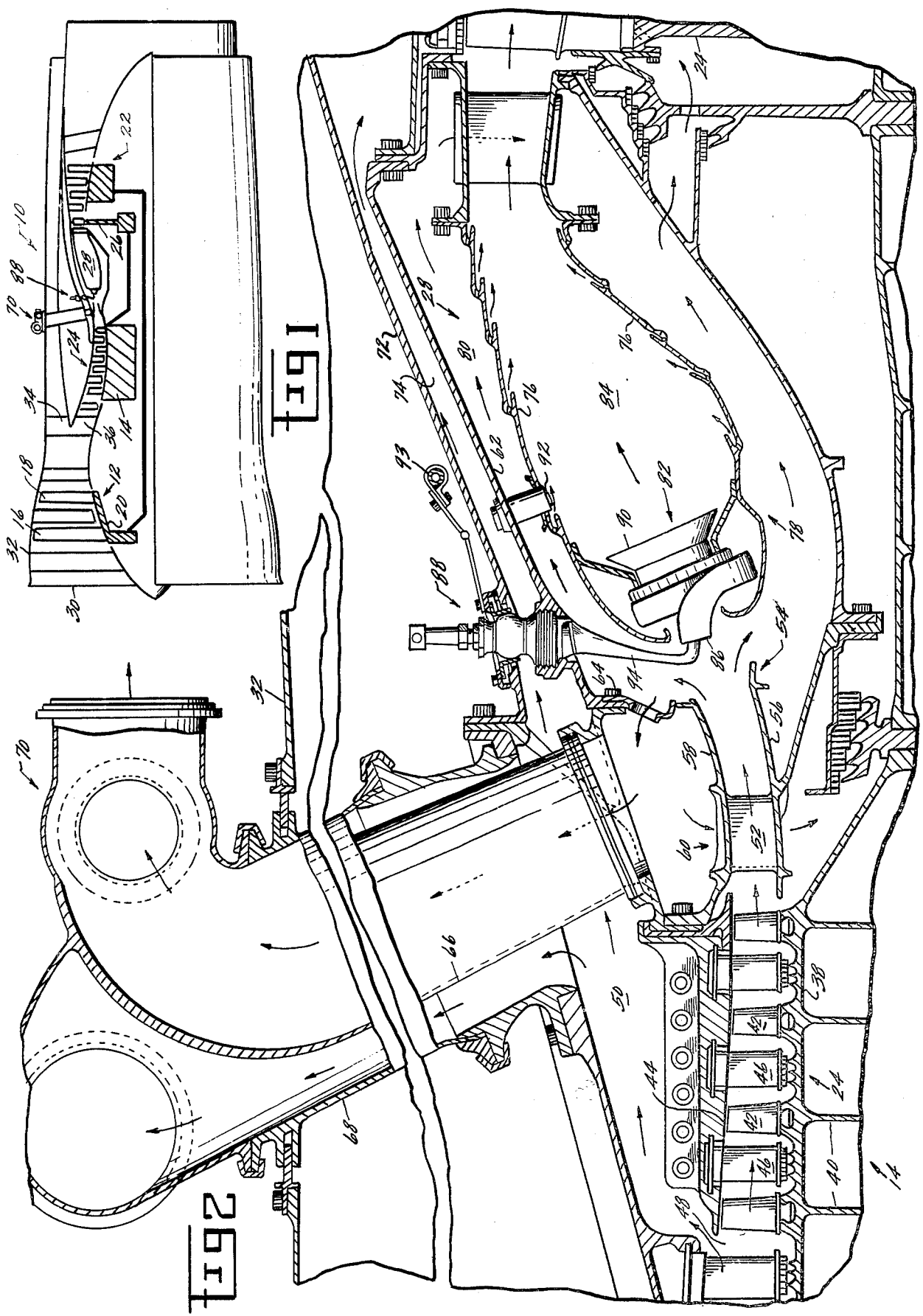

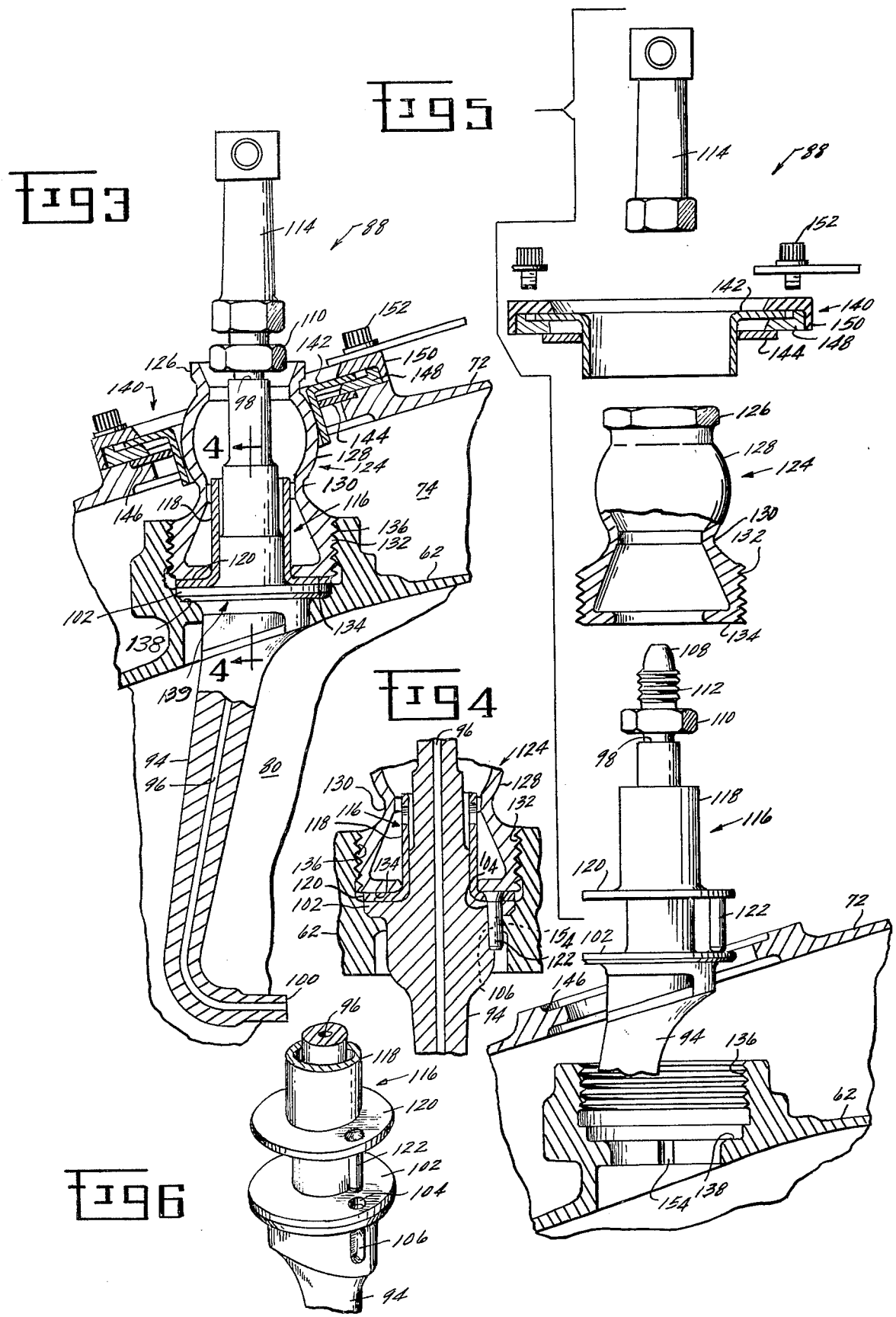

GAS TURBINE ENGINE FUEL DELIVERY TUBE ASSEMBLY

The invention herein described was made in the course of or under a contract, or a subcontact thereunder, with the United States Department of the Air Force.

BACKGROUND OF THE INVENTION

This invention relates generally to gas turbine engine combustors and, more particularly, to a fuel delivery tube assembly for use with a double wall engine casing.

It is often desirable that an aircraft gas turbine engine include a compressor which permits bleeding of high pressure air from between two of the upstream stages thereof to provide pressurized air for operation of airframe accessories, engine accessories, or engine or aircraft de-icing systems. In many cases, this same interstage bleed air is utilized to cool downstream turbine components of the engine. In today's high temperature engines, it is also desirable to provide structure which permits bleeding of even higher pressure air at the discharge end of the compressor to provide pressureized air for cooling combustor components and downstream turbine components.

In many prior art structures, the pressurized air which was bled from upstream stages of the compressor or the compressor discharge was delivered to its ultimate point of usage by means of external tubing or piping mounted externally of the engine casing. Recent developments in the gas turbine industry have provided an improved casing/bleed structure which provides coolant flow paths around the combustor and permits delivery of both intermediate and compressor discharge bleed air to a single point externally of the engine. This improved casing/bleed structure is discussed more fully in application Ser. No. 258,885 entitled "Combustor Casing Cooling Structure," which application is assigned to the same assignee as the present invention. As described in that application, the improved casing structure provides a double wall casing around the combustor portion of a turbofan engine, with the double wall casing providing two completely separate cooling flow paths around the combustor.

While this new casing structure provides a number of benefits such as minimum blockage of the gas flow path, reduced frontal area, etc., the casing structure also imposes new requirements on any fuel delivery mechanism associated with the combustor which is located within the double-walled casing. For example, any fuel delivery mechanism associated with this double-walled casing must provide positive seals against leakage of the high pressure/high temperature gas flowing through the dual cooling flow paths. The fuel delivery tube mechanism must also provide adequate floatability in the seals to accommodate relative thermal growth of both casings. In addition, the fuel tube mechanism must be readily accessible and removable from a maintenance standpoint and must be incapable of being improperly installed within the engine.

SUMMARY OF THE INVENTION

It is an object of the present invention, therefore, to provide a fuel delivery tube assembly for use with a double-walled engine casing, which assembly provides adequate sealing and permits relative movement between the casings.

It is a further object of this invention to provide such a fuel delivery tube assembly which is incapable of being improperly installed within the engine.

Briefly stated, the above and similarly related objects are attained in the present instance by providing a fuel delivery tube assembly which includes a main body member having an inlet and an outlet and a fuel passageway connecting the inlet to the outlet, an alignment collar adapted to surround a portion of the main body member and be captured thereby, and a spherical plug which surrounds the alignment collar and has associated therewith first and second sealing means which prevent the flow of high pressure air between the fuel tube assembly and the first and second engine casings, respectively. The alignment collar is provided with means for preventing connection of the spherical plug to an opening associated with one of the engine casings unless the outlet of the main body member is properly aligned with a fuel/air carbureting device associated with the combustor portion of the engine.

BRIEF DESCRIPTION OF THE DRAWINGS

While the specification concludes with a series of claims which particularly point out and distinctly claim the subject matter which Applicants consider to be their invention, a complete understanding of the invention will be gained from the following description which is given in connection with the accompanying drawings, in which:

FIG. 1 is a greatly simplified schematic view, taken partially in section, of a turbofan engine incorporating the present invention;

FIG. 2 is an enlarged detailed drawing, taken partly in section, with portions broken away, of the engine casing and fuel tube delivery assembly;

FIG. 3 is an enlarged sectional view, with portions deleted, taken generally along line 3—3 of FIG. 2;

FIG. 4 is an enlarged sectional view taken generally along line 4—4 of FIG. 3;

FIG. 5 is an exploded view of the inventive fuel delivery assembly; and

FIG. 6 is a perspective view of portions of the fuel delivery tube assembly.

DESCRIPTION OF A PREFERRED EMBODIMENT

Referring to the drawings wherein like numerals correspond to like elements throughout, attention is directed initially to FIG. 1 wherein a turbofan engine 10 is shown to include a fan rotor 12 and a core engine rotor 14. The fan rotor 12 includes a plurality of fan blades 16 and 18 mounted for rotation on a disc 20. The fan rotor 12 also includes a low pressure or fan turbine 22, which drives the fan disc 20 in a well-known manner. The core engine rotor 14 includes a compressor 24 and a power, or high pressure, turbine 26 which drives the compressor 24. The core engine also includes a combustion system 28, the details of which are shown most clearly in FIGS. 2 through 6.

In operation, air enters the gas turbine engine 10 through an inlet 30 provided by means of a suitable cowling 32 which surrounds the fan rotor 12 and the core engine rotor 14 and provides an external casing for the engine. Air entering the inlet 30 is compressed by means of rotation of the fan blades 16 and 18 and thereafter is split into two flow streams, a bypass stream or passageway 34 and a core engine stream or passageway 36.

The pressurized air which enters the core engine passageway 36 is further pressurized by means of the compressor 24 and is thereafter ignited along with fuel in the combustion system 28. This highly energized gas stream then flows through the turbine 26 to drive the compressor 24 and thereafter through the turbine 22 to drive the fan rotor disc 20.

The pressurized air flowing through the bypass passageway 34 is either mixed with the core engine exhaust stream by means of a suitable mixer (not shown) or is allowed to exhaust to ambient conditions as a relatively low velocity, low pressure stream surrounding the core engine exhaust. In either case, the core engine exhaust and the fan bypass exhaust provide a propulsive force for an aircraft powered by the turbofan engine 10.

It should be noted that although the present description is limited to an aircraft gas turbine engine, the present invention may be applicable to any gas turbine engine power plant such as those utilized for marine and industrial usage. Furthermore, while the above description is representative of a low bypass ratio turbofan engine, the present invention may be applicable to any type of gas turbine engine power plant such as a high bypass ratio turbofan or a straight turbojet engine. The description of the engine shown in FIG. 1 is thus merely illustrative of the type engine to which the present invention is applicable.

Referring now to FIG. 2, the details of the inventive combustor fuel delivery tube assembly are shown in relation to the downstream portion of the compressor 24, the initial stage of the turbine 26 and the combustion system 28. As shown therein, the compressor 24 includes a rotor 38 having a number of rotor stages 40 which carry a plurality of individual rotor blades 42. The compressor 24 further includes a first casing structure 44, which defines the outer bounds of the compressor flow path and includes mounting provisions for a plurality of stator vanes 46 aligned in individual stages between each stage of the rotor blades 42.

The compressor casing structure 44 provides an annular orifice 48 immediately upstream of one of the intermediate stages of the rotor blades 42 for bleeding interstage air from the interior of the compressor 24. This interstage bleed air is then delivered to an annular plenum 50 which surrounds the upstream portion of the compressor casing structure 44.

A more detailed description of the compressor casing structure 44 is given in U.S. Pat. No. 3,597,106 — Anderson, entitled "Combination Compressor Casing-Air Manifold Structure," assigned to the same assignee as the present application.

As further shown in FIG. 2, located immediately upstream of the last stage of the compressor rotor blades 42 is a cascade of fixed compressor outlet guide vanes 52, which direct the compressor discharge air to a step diffuser 54 comprised of an inner diffuser wall 56 and an outer diffuser wall 58. The inner and outer diffuser walls 56 and 58 form a portion of a diffuser casing 60, the details of which are described and claimed in application Ser. No. 258,885—Johnson et al., entitled "Combustor Casing Cooling Structure," assigned to the same assignee as the present application. As described in that application, the diffuser casing 60 provides a mounting point for an outer combustor casing 62, which is connected thereto in any suitable manner, such as by means of bolts 64.

The diffuser casing 60 also provides mounting points for co-annular bleed tubes 66 and 68 which deliver compressor discharge and interstage compressor bleed air to a fitting 70 mounted to the engine cowling 32. The details of the compressor bleed structure are described and claimed in application Ser. No. 258,884 - Johnson et al., entitled "Combustor Casing and Concentric Air Bleed Structure," assigned to the same assignee as the present application.

Referring still to FIG. 2, the engine 10 further includes an outer casing 72, the downstream end of which surrounds the outer combustor casing 62 and co-operates therewith to form an annular passageway 74. Similarly, the outer combustor casing 62 cooperates with one of a pair of combustor liners 76 associated with a combustor 78 to form a second annular passageway 80. As more fully described in the above-referenced Ser. No. 258,885 Johnson et al. application, the passageways 74 and 80 act as coolant flow paths for interstage bleed air and compressor discharge bleed air, respectively.

As further shown in FIG. 2, the combustor 78 includes a plurality of fuel/air carbureting devices 82 located at the upstream end of an annular combustion zone 84 formed between the combustor liners 76. Each of the carbureting devices 82 includes an inlet 86 which is positioned so as to receive a portion of the compressor discharge air flowing through the diffuser 54. Each of the carbureting devices 82 is also provided with a fuel delivery tube assembly 88, the details of which, as shown in FIGS. 3 through 6, form a significant portion of the present invention. The fuel which is delivered by the fuel delivery tube assembly 88 is mixed with the pressurized air in the fuel/air carbureting device 82 and is delivered to the combustor 78 through an outlet 90 associated with the carbureting device 82. The resultant fuel/air mixture is ignited by means of an igniter 92 within the combustion zone 84 in a well-known manner. Fuel is delivered to each of the fuel delivery tube assemblies 88 by means of a manifold 93, the details of which are described in application Ser. No. 286,433 — Stenger et al., entitled "Fuel Distribution System," assigned to the same assignee as the present invention.

Referring now to FIGS. 3 through 6, the details of the inventive fuel delivery tube assemblies 88 will be described in greater detail. Each of the assemblies 88 includes a main body member 94 having a fuel passageway 96 formed therein. The main body member 94 further includes an inlet end 98 and an outlet end 100, with the passageway 96 extending from the inlet 98 to the outlet 100. An enlarged platform member 102 is located between the inlet 98 and outlet 100 and is preferably formed integrally with the main body member 94. As best shown in FIG. 6, the platform member 102 has an opening 104 located therein which aligns with a groove 106 formed within the main body member 94. Each of the main body members 94 also has associated therewith a fitting 108 which is secured to the inlet 98 in any desired manner, such as by welding, and which provides a calibration orifice (not shown) which permits calibration of individual main body members. The calibration orifice could, of course, be located at the outlet 100 instead of at the inlet. The fitting 108 has associated therewith a wrenching surface 110, the purpose of which will be described hereafter, and a threaded surface 112 by means of which a fitting 114 may be connected thereto. The fitting 114 is, in turn, connected to a supply of fuel in the manner described in the above-referenced Stenger et al. application.

Referring still to FIGS. 3 through 6, each of the main body members 94 has associated therewith an alignment collar 116 which consists of a cylindrical portion 118 and an enlarged platform 120 adapted to come into contact with the platform 102 when the alignment collar 116 is positioned as shown in FIG. 3. The alignment collar 116 is further provided with a pin 122 which is attached to the enlarged platform 120 and extends therefrom in the direction opposite that of the cylindrical portion 118. The pin 122 is sized so as to fit within the opening 104 formed within the enlarged platform member 102 and to lie partially within the groove 106 in order to preclude misassembly of the fuel tube main body member 94 with respect to the inlet 86 of the fuel/air carbureting device 82. The manner in which the pin 122 provides this function will be described hereafter.

Each of the fuel delivery tube assemblies 88 also includes a spherical plug 124 which includes, from top to bottom as shown in FIG. 3, a wrenching surface 126, a spherical bushing 128, a cylindrical section 130, an externally threaded enlarged cylindrical section 132, and a flat bottom surface 134. As further shown in FIG. 3, the spherical plug 124 is hollow and is adapted to surround both a portion of the main body member 94 and the cylindrical portion 118 of the alignment collar 116. Furthermore, the flat bottom surface 134 is sized so as to come into contact with the top of the enlarged platform 120 when the spherical plug 124 is assembled as shown in FIG. 3.

The threaded section 132 of the spherical plug 124 is sized so as to fit within a threaded opening 136 formed within the outer combustor casing 62 as shown in both FIGS. 2 and 3. When assembled as shown in FIG. 3, the bottom surface of the platform member 102 of the main body member 94 lies in contact with a flat surface 138 formed within the outer combustor casing 62 to provide a first sealing means, which is generally labeled 139. The spherical plug 124 captures the enlarged platform 120 of the alignment collar 116 between its flat bottom surface 134 and the top of the enlarged platform member 102 as shown in FIG. 3. In this manner, the flow of high pressure gas from the passageway 80 to the passageway 74 around the main body member 94 is substantially precluded with the primary sealing taking place between the flat surface 138 and the bottom of the enlarged platform member 102.

The external surface of the spherical plug 124 has a second sealing means 140 associated therewith. Sealing means 140 take the form of a floating collar 142 which surrounds the spherical bushing 128 and is sized so as to come into contact with the external surface thereof. The floating collar 142 is positioned within a resilient seal ring 144 which is captured within a groove 146 formed within the outer casing 72 by means of a washer 148. The washer 148 is in turn captured between the outer casing 72 and the floating collar 142 by means of an external collar 150 which is connected to the outer casing 72 in any suitable manner, such as by bolts 152. The floating collar 142 is free to slide back and forth a slight distance due to the fact that the opening within the washer 148 is sized larger than the floating collar 142. In this manner the sealing means 140 is capable of withstanding slight differential movement between the outer combustor casing 62 and the compressor casing 72 while still maintaining effective sealing around the perimeter of the spherical bushing 128. In other words, fluid is prevented from flowing from the passageway 74 around the spherical bushing 128 into a chamber which surrounds the outer compressor casing 72.

As previously mentioned, the fuel delivery tube assembly 88 is provided with alignment means which prevent connection of the fuel tube to the combustor except when the outlet end 100 is properly aligned with the inlet 86 of the fuel/air carbureting device 82. The alignment means include the alignment collar 116 and the pin 122 associated therewith. In assembling the fuel tube, the alignment collar 116 is positioned such that the pin 122 lies within the opening 104 and the groove 106. The main body member is then inserted into the threaded opening 136 and is rotated until that portion of the pin 122 which extends outwardly of the groove 106 engages a slot 154 formed within the base of the threaded opening 136. When the pin 122 engages the slot 154, the enlarged platform member 102 will drop down into contact with the flat surface 138. The spherical plug 124 is then inserted into the threaded opening 136 and torqued by means of the wrenching surface 126 until the flat bottom surface 134 contacts the enlarged platform member 102, thereby securing the main body member 94 in place.

The pin 122, the groove 106 and the slot 154 are located, with respect to the outlet 100, such that the outlet 100 is properly aligned with the inlet 86 of the carbureting device 82 only when the pin 122 is aligned with the slot 154. Furthermore, the pin 122 is made of sufficient length such that the threaded section 132 of the spherical plug 124 cannot engage the threaded opening 136 unless the pin 122 is located within the groove 106. That is, the pin is made of sufficient length such that the spherical plug 124 cannot be torqued down onto the enlarged platform member 102 thereby forcing the pin into the platform member 102 and permitting potential misalignment of the outlet 100.

From the above detailed description, it should be readily apparent that Applicants have provided a new and simple fuel delivery tube assembly which is incapable of being misaligned with respect to the fuel/air carbureting device to which it is intended to deliver fuel. Thus, it is impossible for fuel to be sprayed into the diffuser 54 or into the area upstream of the inlet 86. Furthermore, Applicants have provided an assembly which includes first sealing means which preclude the flow of high pressure, high temperature air from the passageway 80 into the passageway 74 and second sealing means which preclude the flow of air from the passageway 74 into the chamber surrounding the outer casing 72. In addition, Applicants have provided an assembly whereby the main body member may be removed from the engine either with the combustor in place or without the combustor in place. Finally, Applicants have provided an assembly which is capable of withstanding relative motion between the two engine casings through which the fuel tube must penetrate in order to be capable of supplying fuel to the combustor.

It should be understood that slight deviations could be made in the above-described structure without departing from the broader inventive aspects of Applicants' device. For this reason, it is intended that the appended claims cover such modifications.

What is claimed is:

1. In a gas turbine engine of the type including a compressor, a combustor having associated therewith at least one fuel/air carbureting device, a turbine operative to drive said compressor, and a low pressure fuel tube adapted to deliver fuel to said carbureting device, said fuel tube including an inlet for receiving fuel and an outlet for delivering fuel to said carbureting device, the improvement comprising:

means for removably connecting said fuel tube to said combustor, said connecting means including alignment means for preventing connection of said tube to said combustor except when said outlet is properly aligned with said carbureting device, wherein said fuel tube includes a main body portion having a fuel passage located therein, said alignment means includes an alignment collar adapted to surround at least a portion of said main body portion, said collar further includes a pin, and said main body portion includes an opening for receiving at least a portion of said pin, said combustor is surrounded by casing means and said casing means includes a groove for receiving said pin when said pin is located within said opening.

2. The improvement recited in claim 1 further including a spherical plug adapted to surround a portion of said main body portion.

3. The improvement recited in claim 2 wherein said spherical plug includes a threaded portion and said combustor includes a threaded opening for receiving said threaded portion of said spherical plug.

4. The improvement recited in claim 3 wherein said pin is of sufficient length such that said threaded portion is incapable of engaging said threaded opening unless said pin is properly located within said groove.

5. The improvement recited in claim 2 wherein said spherical plug cooperates with a first sealing means to preclude the flow of fluid around said main body portion when said spherical plug is engaged by said threaded opening.

6. The improvement recited in claim 5 wherein said spherical plug further cooperates with second sealing means adapted to preclude the flow of fluid around said spherical plug.

7. The improvement recited in claim 1 wherein said main body portion includes an outlet end and an inlet end and a calibration orifice.

8. The improvement recited in claim 7 further including a spherical plug adapted to surround a portion of said collar and a portion of said main body portion, said spherical plug including an externally threaded portion adapted to be received in a threaded opening within said combustor, and wherein said main body portion includes an enlarged platform member and said collar is captured between said spherical plug and said platform member.

9. The improvement recited in claim 8 wherein said collar includes a pin and said platform member includes an opening for receiving at least a portion of said pin.

10. The improvement recited in claim 9 wherein said combustor is surrounded by casing means and said casing means includes a groove for receiving said pin when said pin is located within said opening.

11. The improvement recited in claim 10 wherein said spherical plug and said collar cooperate to form a first sealing means between said fuel tube and said casing means.

12. The improvement recited in claim 11 further including second casing means surrounding said first casing means and adapted to provide an annular chamber therebetween, said spherical plug cooperating with second sealing means formed within said second casing means to preclude the flow of fluid from said annular chamber around said spherical plug.

13. A fuel tube assembly for a gas turbine engine combustor comprising a main body portion having an inlet and an outlet and a fuel passage located between said inlet and said outlet, said main body portion further including a platform member formed integrally therewith and located between said inlet and said outlet, an opening in said platform member, an alignment collar adapted to surround a portion of said main body portion, said alignment collar including a pin extending therefrom, a spherical plug adapted to surround a portion of said collar and a portion of said main body portion, said spherical plug including an externally threaded portion adapted to be received in a threaded opening within said combustor, said combustor comprising a groove for receiving said pin when said pin is located within said opening, said alignment collar further adapted to be captured between said platform member and said spherical plug, and said pin being characterized in that it precludes engagement of said threaded portion with the threaded opening except when said pin is located within said opening in said platform member.

* * * * *